United States Patent
Man et al.

(10) Patent No.: US 7,552,300 B2
(45) Date of Patent: Jun. 23, 2009

(54) METHOD FOR MIGRATING OBJECTS IN CONTENT MANAGEMENT SYSTEMS THROUGH EXPLOITATION OF FILE PROPERTIES, TEMPORAL LOCALITY, AND SPATIAL LOCALITY

(75) Inventors: Kwai Hing Man, Fremont, CA (US); Wai Kei So, Daly City, CA (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 11/325,393

(22) Filed: Jan. 3, 2006

(65) Prior Publication Data

US 2007/0156989 A1    Jul. 5, 2007

(51) Int. Cl.
*G06F 12/02* (2006.01)
(52) U.S. Cl. ................... 711/165; 711/161; 711/162; 707/204
(58) Field of Classification Search ........... 711/161, 711/162, 165; 707/204, 205
See application file for complete search history.

(56) References Cited

U.S. PATENT DOCUMENTS

| | | | |
|---|---|---|---|
| 5,564,037 A | 10/1996 | Lam | |
| 2003/0046270 A1 | 3/2003 | Leung et al. | |
| 2003/0208505 A1 | 11/2003 | Mullins et al. | |
| 2004/0064487 A1 | 4/2004 | Nguyen et al. | |
| 2005/0038766 A1 | 2/2005 | Bantz et al. | |
| 2007/0055714 A1 * | 3/2007 | Ishii et al. ................ | 707/204 |

FOREIGN PATENT DOCUMENTS

WO    2002025445 A3    3/2002

* cited by examiner

*Primary Examiner*—Jasmine Song
(74) *Attorney, Agent, or Firm*—Patterson & Sheridan, LLP

(57) ABSTRACT

A migration object selection method selects data objects for migration from a source storage device to a target storage device. At a scheduled migration date, the method computes a benefit of migration for a selected data object based on adjustable weighted migration properties. If the benefit exceeds a predetermined threshold, the selected data object is migrated. Otherwise, the selected data object is not migrated. The weighted migration properties comprise last reference date, data object size, version, format, access speed of the source storage device, access speed of the target storage device, speed of a network, and location of the source storage device. The weighted migration properties are weighted with an adjustable weighting factor that indicates a relative importance of each of the weighted migration properties.

20 Claims, 3 Drawing Sheets

METHOD FOR MIGRATING OBJECTS IN CONTENT MANAGEMENT SYSTEMS THROUGH EXPLOITATION OF FILE PROPERTIES, TEMPORAL LOCALITY, AND SPATIAL LOCALITY

FIELD OF THE INVENTION

The present invention generally relates to migrating data objects from a source storage device to a target storage device and in particular to selecting data objects for migration based on characteristics of the data object and the migrating system to efficiently use computational resources.

BACKGROUND OF THE INVENTION

Distributed computational systems such as content management systems manage large amounts of data in storage systems that are typically geographically distributed. These distributed computational systems comprise methods for migrating data from one or more source storage devices to one or more target storage devices. For example, data in the distributed computational systems are migrated in a batch to a new storage system when the source storage system is replaced.

A distributed computational system such as a content management system manages diverse data objects such as files, documents, images, video, audio, etc. Conventional content management systems archive data objects by continually migrating unused data objects from the source storage devices acting as main storage devices to the target storage devices acting as archive storage devices. The source storage devices comprise memory that can be quickly accessed. The target storage devices comprise slower memory such as, for example, an optical disk. The data objects are archived to free up the faster memory and to manage storage of the data objects.

Content management systems typically migrate data for archiving based on a predetermined migration policy. The migration policy is set by a system administrator and comprises a predetermined allowed storage duration in terms of elapsed time during which a data object resides on the main storage device. A resource manager of the content management system monitors data objects on the main storage device. When the amount of time that a data object has resided on the main storage device exceeds the allowed storage duration, the resource manager migrates the data object to the archive data device. Although this technology has proven to be useful, it would be desirable to present additional improvements.

Conventional migration policies for content management systems are based only on allowed storage duration, determined from a date of importation. However, regardless of how often a data object is retrieved, a data object is archived after the data object has resided in the main storage device for a predetermined allowed storage duration such as, for example, 30 days. Retrieval of a data object may be requested after the data object is migrated to the archived data device. Consequently, the resource manager has to retrieve the data object from the archive data device. This transfer of the data object to and from the archive storage device is inefficient and costly in terms of system resources such as bandwidth. Furthermore, a large data object that is likely to be retrieved may be migrated to the archive data device. When required by a user, the large data object is retrieved. This retrieval may take several hours or even days. Consequently, the large data object is not available to the user during the retrieval time and bandwidth involved in the migration of the data object to the archive storage device and retrieval of the data object from the archive storage device is wasted.

Conventional migration policies apply the allowed storage duration to all data objects indiscriminately. Reducing the allowed storage duration increases the number of retrievals of data objects migrated to the archive data device. Increasing the allowed storage duration requires additional storage space in the main storage device, which is typically a more expensive, faster storage space.

What is therefore needed is a system, a computer program product, and an associated method for selecting data objects for migration that considers in the migration policy properties of data objects such as version, data object format, data object size, reference date, data object version, etc. The need for such a solution has heretofore remained unsatisfied.

SUMMARY OF THE INVENTION

The present invention satisfies this need, and presents a method for selecting data objects for migration from a source storage device to a target storage device. At a scheduled migration date, the method computes a benefit of migration for a selected data object based on one or more weighted migration properties. If the benefit of migration exceeds a predetermined threshold, the selected data object is migrated. Otherwise, the selected data object is not migrated.

The weighted migration properties comprise weighted properties of the data object and weighted properties of a data object transfer. The weighted properties of the data object comprise a last reference date, a data object size, a version, and a format. The weighted properties of the data object transfer comprise a speed of the source storage device, speed of the target storage device, speed of a network, and location of the source storage device. The weighted properties are adjustable.

In one embodiment, the predetermined threshold is a value based on a relative value compared to the benefit of migration of one or more additional data objects. The weighted migration properties are weighted with a weighting factor that indicates a relative importance of each of the weighted migration properties. The weighting factor is adjustable.

The present system may be embodied in a utility program such as a migration object selection utility program. The present system also provides a method for the user to specify selection of data objects for migration by specifying weighted properties of a data object, weighted properties of a data object transfer, and weighting factors, and then invoking the migration object selection utility to select data objects for migration. The weighted properties of a data object comprise a last reference date, a data object size, a version, and a format. The weighted properties of the data object transfer comprise a speed of the source storage device, speed of the target storage device, speed of a network, and location of the source storage device. Weighting factors comprise a relative importance for each of the weighted migration properties.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
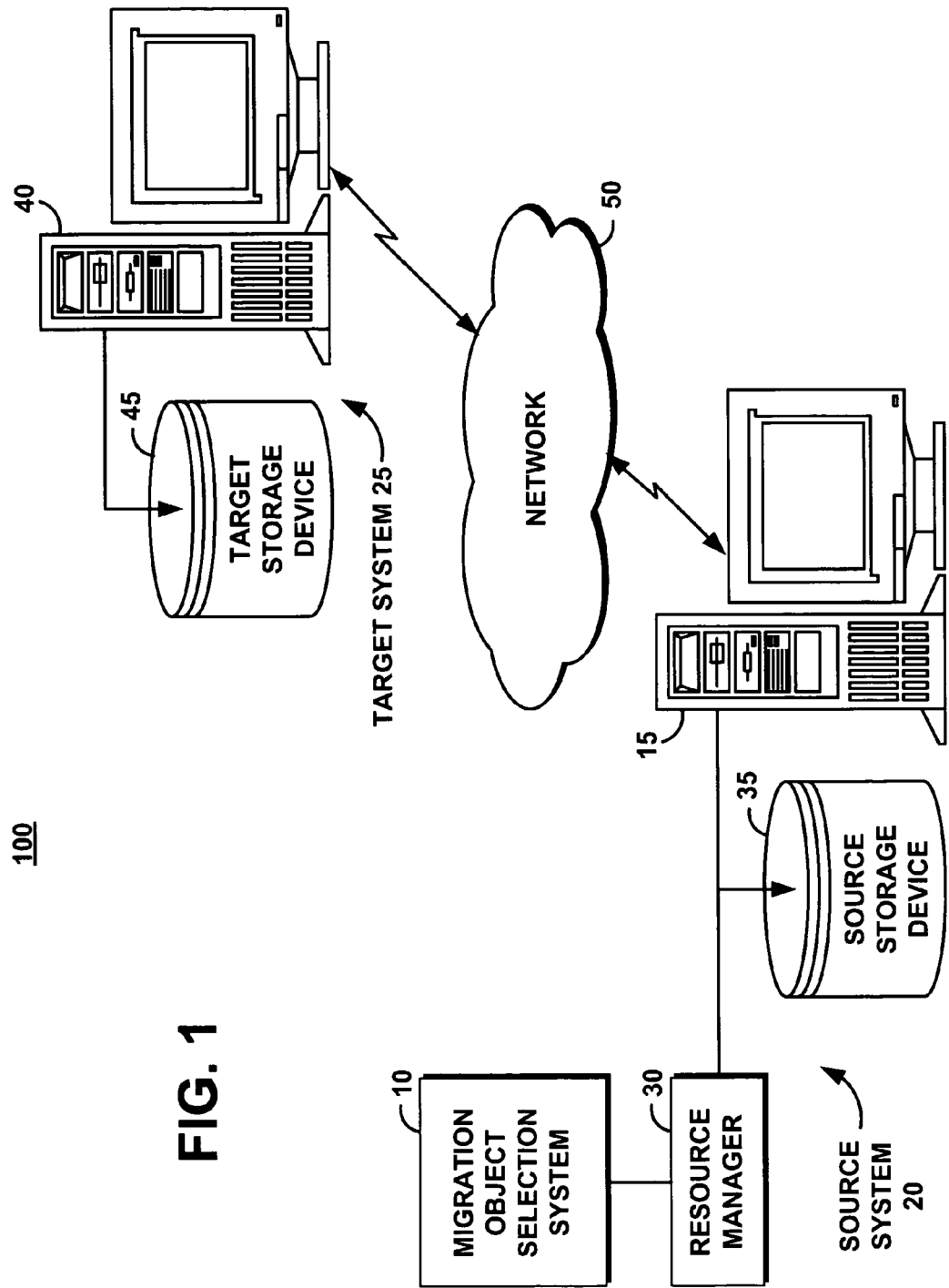
FIG. 1 is a schematic illustration of an exemplary operating environment in which a migration object selection system of the present invention can be used.

FIG. 1 portrays an exemplary overall environment (a content management system 100) in which a system, a computer program product, and an associated method (the "system 10") for selecting data objects for migration according to the present invention may be used. System 10 comprises a software programming code or a computer program product that is typically embedded within, or installed on a source computer 15. Alternatively, system 10 can be saved on a suitable storage medium such as a diskette, a CD, a hard drive, or like devices.

The content management system 100 comprises a source system 20 and a target system 25. The source system comprises a resource manager 30, a source storage device 35, the source computer 15, and system 10. The target system 25 comprises a target computer 40 and a target storage device 45. The resource manager 30 manages migration of data objects in the source storage device 35 to the target storage device 45 via a network 50. While the system 10 is described for illustration purpose only in relation to network 50, it should be clear that system 10 is applicable as well to, for example, a target system 25 co-located with the source system 20 such that data objects are migrated directly from the source storage device 35 to the target storage device 45. The target system 25 may be at a remote location or located locally as compared to the source system 20.

The resource manager 30 reviews at a scheduled migration date a storage duration for at least some of the data objects stored on the storage device 35. An exemplary migration policy of the resource manager 30 requires migration after, for example, an allowed storage duration of 30 days. The migration policy is set by an administrator of the content management system 100.

For data objects with a storage duration that exceeds an allowed storage duration as determined by the migration policy of the resource manager 30, system 10 determines a benefit of migration. The benefit of migration quantifies data object properties and data object transfer properties considered by system 10 in determining which data objects to migrate. The data object properties considered by system 10 for a data object comprise, for example, a last retrieval date (D) of the data object, size (F) of the data object, version (V) of the data object, format (M) of the data object, etc. System 10 further considers data object transfer properties associated with the source system 20, the target system 45, and the content management system 100. Data object transfer properties considered by system 10 comprise, for example, network speed (NS), access speed of the source storage device 35 (SS), access speed of the target storage device 45 (TS), location of the resource manager 30 within the content management system 100, etc.

In general, system 10 allows data objects that are more frequently used or more likely to be used to remain in the source storage device 35 while migrating data objects that are less frequently used or less likely to be used. In this manner, system 10 improves storage efficiency of the content management system and conserves computing and transmission resources of the content management system.

System 10 calculates the benefit of migration for at least some of the data objects stored in the source storage device 35. The benefit of migration, G, for a selected data object is determined as:

$$G(\text{data object}) = \frac{P_D k_D + P_F k_F + P_V k_V + \ldots + P_M k_M + T_{SS} k_{SS} + T_{TS} k_{TS} + T_{NS} k_{NS} + \ldots + T_L k_L}{|R|}$$

where R is the cardinality of the set of constants that represent the weight of the factors. Weighting factors k and weighted migration properties comprising weighted data object properties P and weighted data object transfer properties T are defined in Table 1. The weighted object properties P, data object transfer properties T, and weighting factors k used to determine the benefit of migration, G, are adjustable. The weighting factors k are constants used to provide a relative weighting between the weighted properties P and T. The weighted data object properties P, weighted data object transfer properties T, and weighting factors listed in Table 1 are provided for illustration purposes only. Any property of the data object or data object transfer may be used to determine the benefit of migration, G, for a selected data object.

In an alternative embodiment, the benefit of migration, G, does not need to be greater than the threshold for migration to take place. Rather, migration of document x occurs if the benefit of migration, G for document x is greater than the benefit of migration, G of document y. If the benefit of migrations, G of the all the documents is greater than the threshold, then no migration will take place.

Weighted data object properties, weighted data object transfer properties, and weighting factors used to determine the benefit of migration, G, for a data object.

TABLE 1

Weighted data object properties, weighted data object transfer properties, and weighting factors used to determine the benefit of migration, G, for a data object.

| Property Name | Weighted Migration property | Weighting Factor |
| --- | --- | --- |
| Last Reference Date, D | $P_D$ | $k_D$ |
| Data object Size, F | $P_F$ | $k_F$ |
| Version, V | $P_V$ | $k_V$ |
| Format, M | $P_M$ | $k_M$ |
| Access speed of source storage device, SS | $T_{SS}$ | $k_{SS}$ |
| Access speed of target storage device, TS | $T_{TS}$ | $k_{TS}$ |
| Network Speed, NS | $T_{NS}$ | $k_{NS}$ |
| Resource Manager Location, L | $T_L$ | $k_L$ |

For example, text (txt) files may be determined as more likely to be retrieved than mpeg files. In this case, system 10 determines if format M=mpeg, then an approximate value for $P_M$ may be $P_M$=0.7, and if M=txt, then an approximate value for $P_M$ may be $P_M$=0.5, indicating that data objects with an mpeg format are more likely to be migrated than data objects with a text format. Another example is if D=today then an approximate value for $P_D$ may be 0.1, whereas if D=last week then an approximate value for $P_D$ may be 0.5 and if D=last month then an approximate value for $P_D$ may be 1.0, indicating that less recently referenced data objects are more likely to be migrated than more recently referenced data objects. In general, a higher value implies a higher probability of migration.

The weighting factors k indicate a relative importance of each property. For example, an approximate value for $k_D$, may be 0.7 and an approximate value for $k_M$ may be 0.3, indicating that the last referenced date is more heavily weighted than the data object format.

Figure 2:
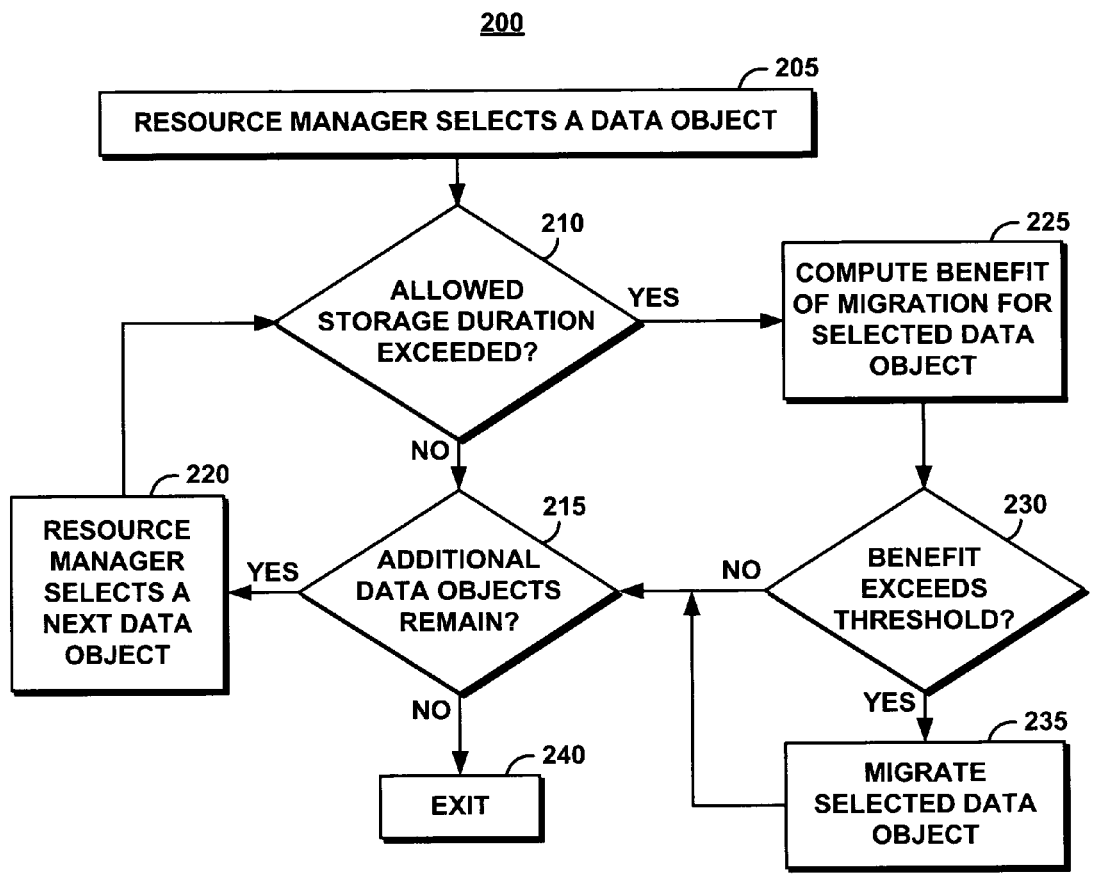
FIG. 2 is a process flow chart illustrating a method of operation of the migration object selection system of FIG. 1.

FIG. 2 illustrates a method 200 of system 10 in selecting one or more data objects for migration from the source storage device 35 to the target storage device 45. During a review at a scheduled date of migration of data objects on the source storage device 35, the resource manager 30 selects a data object (step 205). The resource manager 30 determines whether a storage duration of the selected storage object exceeds an allowed storage duration (decision step 210). For example, a migration policy of the content management system 100 requires migration of a data object after the data object has resided on the source storage device for 30 days. In this case, the allowed storage duration is 30 days.

If the storage duration of the selected data object has not exceeded the allowed storage duration, the resource manager 30 determines whether additional data objects remain in the source storage device 35 for processing (step 215). If additional data objects remain, the resource manager selects a next object (220), and processing returns to decision step 210. Otherwise, the resource manager exits processing (step 240).

If the storage duration of the selected data object exceeds the allowed storage duration (decision step 210), system 10 computes the benefit of migration, G, for the selected data object (step 225). If the computed benefit of migration, G, for the selected data object exceeds a predetermined threshold (decision step 230), system 10 causes the selected data object to migrate (step 235). Otherwise, processing continues to decision step 215. In one embodiment, the predetermined threshold is a predetermined relative threshold such that the migration benefit, G, of the selected data object is compared to the migration benefits, G, of other data objects stored on the source storage device 35.

Figure 3:
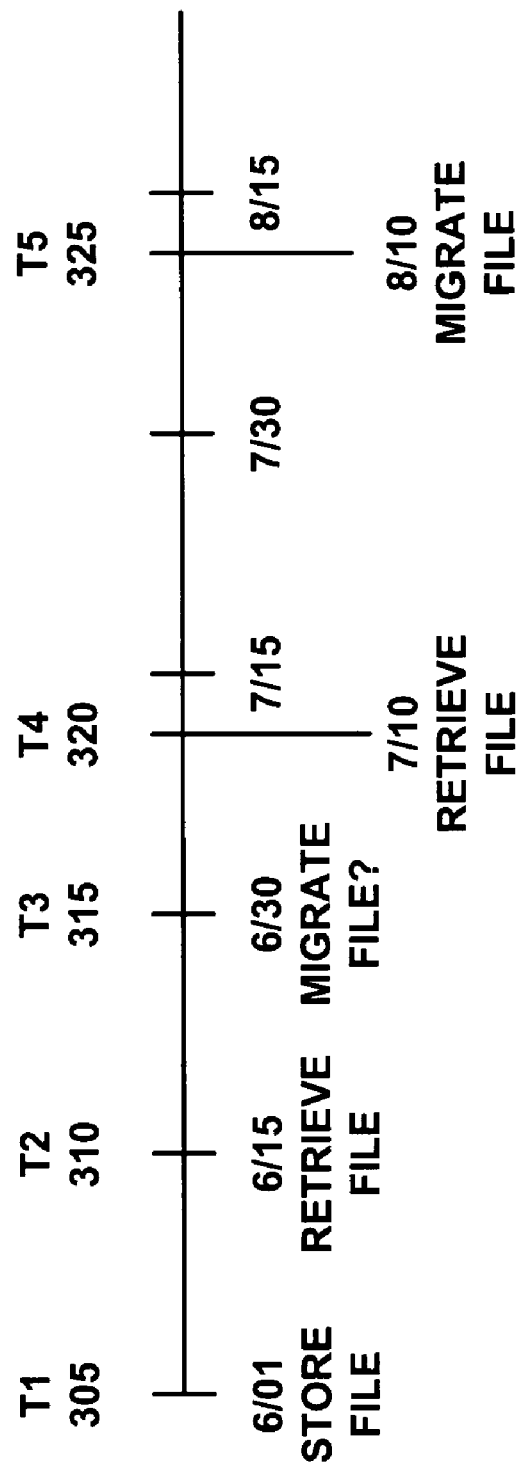
FIG. 3 is a timeline illustrating a selection of a data object for migration by the migration object selection system of FIG. 1.

The exemplary timeline 300 of FIG. 3 illustrates migration management of an exemplary data object or file by system 10 in which the migration policy is to migrate data objects or files after the data objects or files have been stored in the source storage device for 30 days and in which the migration benefit, G, is based only on last reference date, D.

The file is stored at T1, 305, (i.e., June 1) in the source storage device 35. At T2, 310 (i.e., June 15), a user of the content management system 100 retrieves the file. System 10 reviews the migration benefit, G, of the file at time T3, 315 (i.e., June 30). Since the file was retrieved 15 days previously, the file is not migrated.

The user retrieves the file again at time T4, 320 (i.e., July 10). When the system 10 reviews the migration benefit, G, of the file at time T5, 325 (i.e., August 10), system 10 determines that the file has not been retrieved in the past 30 days. Consequently, the file is migrated to the target storage device 45.

It is to be understood that the specific embodiments of the invention that have been described are merely illustrative of certain applications of the principle of the present invention. Numerous modifications may be made to the system and method for selecting data objects for migration described herein without departing from the spirit and scope of the present invention.

What is claimed is:

1. A processor-implemented method of selecting a plurality of data objects for migration from a source storage device to a target storage device, comprising:
   at a scheduled migration date, computing a value representing a benefit of migration for a selected data object based on a plurality of weighted migration properties;
   if the computed value exceeds a predetermined threshold value, then migrating the selected data object; and
   wherein the weighted migration properties comprise a weighted property of the data object and a weighted property of a data object transfer.

2. The method of claim 1, wherein the weighted properties of the data object comprise a last reference date, a data object size, a version, and a format.

3. The method of claim 1, wherein the weighted properties of the data object transfer comprise an access speed of the source storage device, an access speed of the target storage device, speed of a network, and location of a resource manager of the source storage device.

4. The method of claim 1, wherein the weighted properties are adjustable.

5. The method of claim 1, wherein the predetermined threshold value is a fixed value.

6. The method of claim 1, wherein the predetermined threshold value is based on a relative value compared to the benefit of migration of additional data objects.

7. The method of claim 1, wherein the weighted migration properties are weighted with a weighting factor indicating an importance of each of the weighted migration properties.

8. The method of claim 7, wherein the weighting factor is adjustable.

9. A computer program product having program codes stored on a computer-usable medium for selecting a plurality of data objects for migration from a source storage device to a target storage device, comprising:
   a program code for computing a value representing a benefit of migration for a selected data object, at a scheduled migration date, based on a plurality of weighted migration properties;
   a program code for migrating the selected data object if the computed benefit value exceeds a predetermined threshold value; and
   wherein the weighted migration properties comprise a weighted property of the data object and a weighted property of a data object transfer.

10. The computer program product of claim 9, wherein the weighted properties of the data object comprise a last reference date, a data object size, a version, and a format.

11. The computer program product of claim 9, wherein the weighted properties of the data object transfer comprise an access speed of the source storage device, an access speed of the target storage device, speed of a network, and location of a resource manager of the source storage device.

12. The computer program product of claim 9, wherein the weighted properties are adjustable.

13. The computer program product of claim 9, wherein the predetermined threshold value is a fixed value.

14. The computer program product of claim 9, wherein the predetermined threshold value is based on a relative value compared to a value representing the benefit of migration of additional data objects.

15. The computer program product of claim 9, wherein the weighted migration properties are weighted with a weighting factor indicating an importance of each of the weighted migration properties.

16. The computer program product of claim 15, wherein the weighting factor is adjustable.

17. A processor-implemented system for selecting a plurality of data objects for migration from a source storage device to a target storage device, comprising:
   one or more processors;
   a migration objection selection module which, when executed by at least one of the one or more processors, is configured for computing, at a scheduled migration date, a value representing a benefit of migration for a selected data object based on a plurality of weighted migration properties; wherein the weighted migration properties comprise a weighted property of the data object and a weighted property of a data object transfer; and a resource manager which, when executed by at least one of the one or more processors, is configured for migrating the selected data object if the computed benefit value exceeds a predetermined threshold value.

18. The system of claim 17, wherein the weighted properties of the data object comprise a last reference date, a data object size, a version, and a format.

19. The system of claim 17, wherein the weighted properties of the data object transfer comprise an access speed of the source storage device, an access speed of the target storage device, speed of a network, and location of a resource manager of the source storage device.

20. The system of claim 17, wherein the weighted properties are adjustable.

* * * * *